United States Patent [19]

Hara

[11] 4,345,264

[45] Aug. 17, 1982

[54] CARRIAGE SUPPORT FOR RECORDING HEAD, DIODE MATRIX, AND DRIVERS

[75] Inventor: Kazuyuki Hara, Yokohama, Japan

[73] Assignee: Ricoh Co. Ltd., Japan

[21] Appl. No.: 120,546

[22] Filed: Feb. 11, 1980

[30] Foreign Application Priority Data

Feb. 16, 1979 [JP] Japan .................................. 54-15984

[51] Int. Cl.[3] .............................................. G01D 15/06

[52] U.S. Cl. .................................... 346/154; 346/155; 346/139 L

[58] Field of Search ................... 346/154, 155, 139 L; 358/300

[56] References Cited

U.S. PATENT DOCUMENTS

| | | | |
|---|---|---|---|
| 3,672,043 | 6/1972 | Trimble | 360/119 |
| 3,810,189 | 5/1974 | Casperson | 346/155 |
| 3,875,578 | 4/1975 | Silverberg | 346/155 |
| 3,979,760 | 9/1976 | Tadavchi | 346/155 |
| 4,115,763 | 9/1978 | Brown | 346/154 |
| 4,141,018 | 2/1979 | Mizugvchi | 346/154 |
| 4,180,824 | 12/1979 | Yvard | 346/155 |

*Primary Examiner*—James W. Moffitt
*Assistant Examiner*—Alan Faber
*Attorney, Agent, or Firm*—McGlew and Tuttle

[57] ABSTRACT

A recording system including a recording head with multistyli movable in linear reciprocatory movement crosswise of a recording medium which itself is movable in a direction at right angles to the direction of linear reciprocatory movement of the carriage, and a drive circuit for applying high potentials to the selected styli including a diode matrix connected to the multistyli, and line-direction drivers and row-direction drivers connected to line-direction conductors and row-direction conductors respectively of the matrix. The carriage supports, in addition to the recording head, the diode matrix and the line-direction drivers and/or the row-direction drivers, so that the electrostatic capacity between wires connecting the drivers to the multistyli can be reduced and recording can be performed at high speed.

5 Claims, 4 Drawing Figures

CARRIAGE SUPPORT FOR RECORDING HEAD, DIODE MATRIX, AND DRIVERS

BACKGROUND OF THE INVENTION (1) Field of the Invention

This invention relates in general to recording system, and more particularly to a recording system of the type wherein a recording head with multistyli is mounted on a carriage and predetermined electrostatic recording, electrostatic printing or electric perforating is carried out on a recording medium while the carriage is being moved.

(2) Description of the Prior Art

In one type of recording system used as in a facsimile system known in the art, a carriage carrying a recording head having multistyli arranged in an ancillary scanning direction is moved in reciprocatory movement in a main scanning direction, while a recording medium is fed a predetermined amount in the ancillary scanning direction, to carry out recording as desired. In another type of recording system known in the art, a drum having a recording medium wound thereon is rotated to carry out main scanning, while the aforesaid carriage is moved axially of the drum to effect ancillary scanning.

In the recording system of the prior art wherein the carriage carrying the recording head is moved to perform a predetermined recording on the recording medium, the carriage carries the recording head alone and other parts, such a drive circuit for driving the recording styli and the like, are arranged on stationary members in the recording system, with a view to minimizing the mass of the movable member to increase drive characteristics by minimizing vibration of the movable member at the time of collision, for example. The aforesaid arrangement of movable and fixed members of the recording system of the prior art is also influenced by the notion that parts, such as elements of an electronic circuit, which are sensitive to environmental influences, had better be arranged on the stationary members of the recording system.

Because of this arrangement, the recording system of the prior art has had to use a considerable length of leads corresponding in number to the recording styli which extend from the drive circuit mounted on the stationary member to the recording head on the carriage to cover a maximum moving distance of the recording head.

As a result, the recording system of the prior art has had the disadvantage that the electrostatic capacity between the wires from the drive circuit to the recording styli becomes high, and this high electrostatic capacity has prevented electrostatic recording from being carried out at high speed when using this type of recording system.

SUMMARY OF THE INVENTION

This invention has as one of its objects the provision of a recording system which obviates the aforementioned disadvantage of the prior art and enables recording to be performed at high speed by reducing the electrostatic capacity between the wires.

The aforesaid object of the invention is accomplished by providing a recording system which departs from the established concept for systems of this type and mounts at least the main elements of the drive circuit for driving the recording styli on the carriage together with the recording head.

Another object of the present invention is to provide a recording system construction which is simple in design, rugged in construction and economical to manufacture.

The various features of novelty which characterize the invention is pointed out with particularity in the claims annexed to and forming a part of this disclosure. For a better understanding of the invention, its operating advantage and specific objects attained by its uses, reference is made to the accompanying drawings and descriptive matter in which a preferred embodiment of the invention is illustrated.

BRIEF DESCRIPTION OF THE DRAWINGS

FIG. 1(*b*) is a side view of the embodiment shown in FIG. 1(*a*);

DESCRIPTION OF THE PREFERRED EMBODIMENT

The invention will now be described as being applied to a facsimile system by referring to the embodiment shown in FIGS. 1 to 3.

Figure 1A:
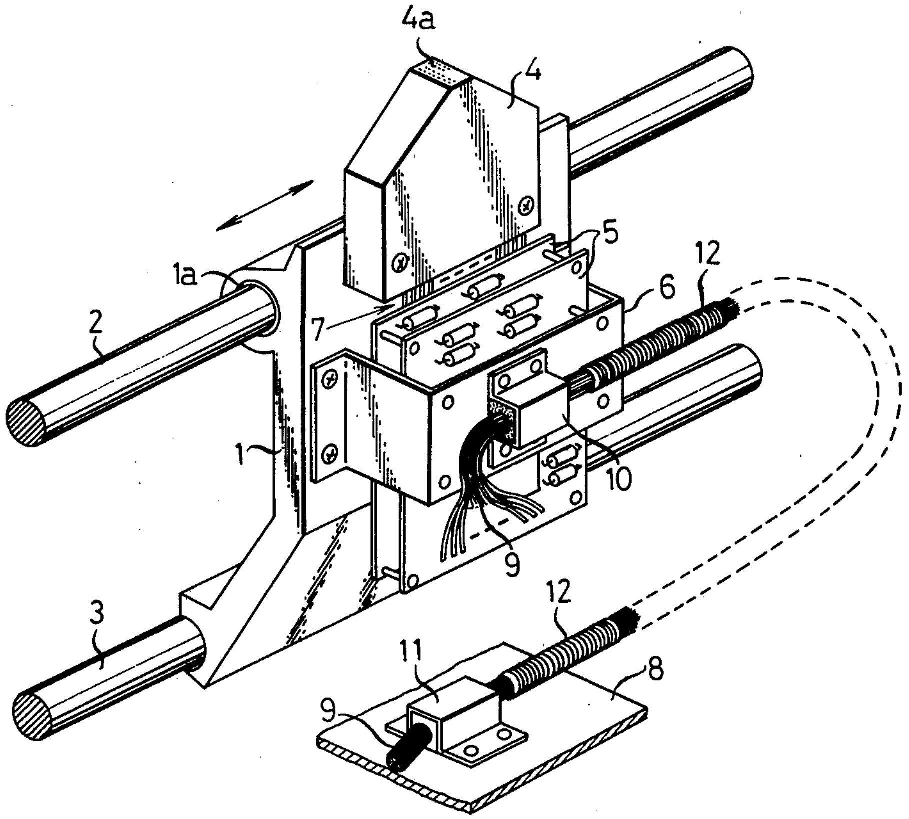
FIG. 1(*a*) is a fragmentary diagrammatic perspective view of a recording system comprising one embodiment of the invention incorporated in a receiver of a facsimile system, which showing leads connecting the main elements of a drive circuit mounted on a carriage with a recording head that is connected to the rest of the drive circuit which is fixed on a stationary member.
Figure 1B:
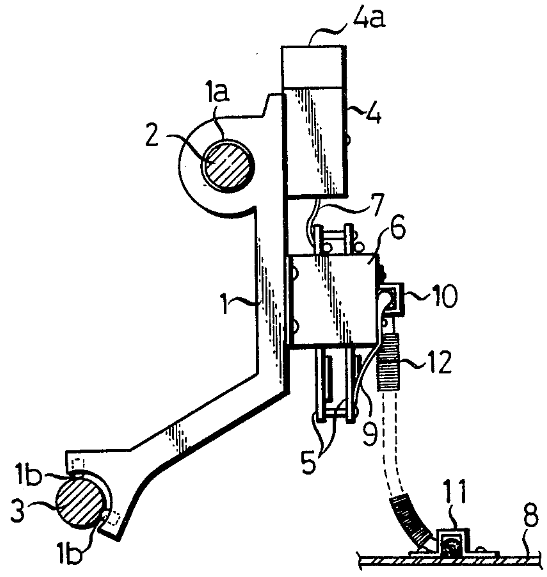

In FIGS. 1(*a*) and 1(*b*), a carriage 1 is supported by two guide bars, 2 and 3 which are arranged above and below in a parallel relationship for the movement of the carriage 1 in a main scanning direction indicated by an arrow in FIG. 1(*a*). The carriage 1 is formed at its upper portion, with an opening 1*a* for allowing the upper guide bar 2 to extend therethrough. The opening is lined with a resin of low coefficient of friction or has a ball bearing arranged on its inner periphery. The carriage 1 has arranged at its lower portion, a bearing 1*b* which rolls along the lower guide bar 3.

The carriage 1 includes a vertical planar surface portion interposed between the two guide bars 2 and 3 which carries, in its upper portion, a recording head 4 and in its central portion a support frame 6 which is in the form of a horizontal letter U that has a flat top and which is secured, at its legs, to the carriage 1. The support frame 6, in the form of a letter U in the lying horizontal position and the vertical planar surface portion of the carriage 1, define therebetween a rectangular space wherein two printed circuit boards 5 are arranged, in a spaced side-by-side relation. The two printed circuit boards 5 are secured to the back of the top of the support frame 6.

Figure 2:
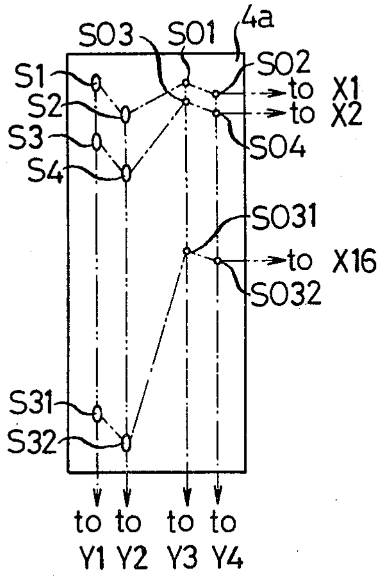
FIG. 2 is a top plan view, on an enlarged scale, of a recording surface of the recording head.

The recording head 4 includes a recording surface 4*a* having arranged thereon, as shown in FIG. 2, an array of recording styli arranged in two pairs of vertical rows. One pair of rows of these recording styli includes a row of styli of odd numbers $S_1$ to $S_{31}$ and a row of styli of even numbers $S_2$ to $S_{32}$ arranged vertically in FIG. 2 (in the ancillary scanning direction) for carrying out recording with a scanning density of 4 line/mm. The other pair of rows of recording styli includes a row of styli of odd numbers $SO_1$ to $SO_{31}$ and a row of styli of even number $SO_2$ to $SO_{32}$ arranged in the same direction as the styli $S_1$ to $S_{32}$ for carrying out recording with a scanning density of 8 line/mm. The styli of odd numbers and the styli of even numbers in each pair of rows are disposed in staggered relation.

Figure 3:
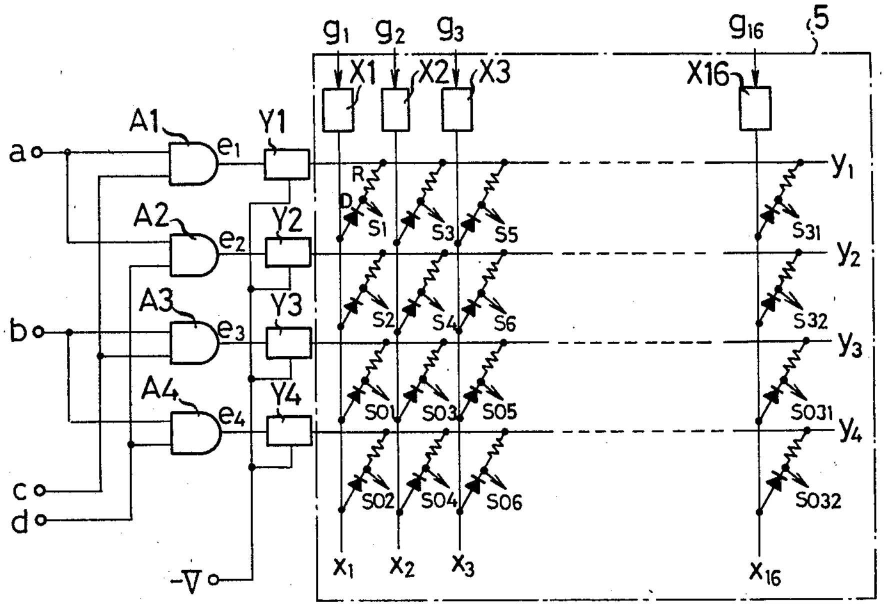
FIG. 3 is a diagram of the drive circuit for electrically driving recording styli of the recording head.

As shown in FIG. 3, a drive circuit for the recording styli includes a diode matrix wherein resistors R and diodes D are arranged for connecting the recording styli, to simplify the arrangement of elements of the drive circuit. More specifically, the recording styli are each connected to the intersection of resistor R and diode D. An odd-number stylus line of the recording styli of odd numbers $S_1$, $S_3$ . . . $S_{31}$ for 4 line/mm recording belongs to a conductor $y_1$ in the direction of the line on the diode matrix, and an even-number stylus line of even numbers $S_2$, $S_4$ . . . $S_{32}$ for 8 line/mm recording belongs to a conductor $y_2$ in the direction of the line. An odd-number styli of the recording styli of odd numbers $SO_1$, $SO_3$ . . . $SO_{31}$ for 8 line/mm recording belongs to a conductor $y_3$ in the direction of the line, and an even-number stylus line of the recording styli of even numbers $SO_2$, $SO_4$ . . . $SO_{32}$ for 8 line/mm recording belongs to a conductor $y_4$ in the direction of the line. The conductors $y_1$ to $y_4$ arranged in the direction of the line on the diode matrix are connected to line-direction recording drivers $Y_1$ to $Y_4$ respectively. Conductors $x_1$ to $x_{16}$ arranged in the direction of the row are connected to row-direction recording drivers $X_1$ to $X_{16}$ respectively.

The drivers $Y_1$ to $Y_4$ have located, in front of them, AND gates $A_1$ to $A_4$ respectively, and each driver is connected to a recording voltage source (−v). The AND gates $A_1$ and $A_2$ are activated by a signal a designating the scanning density 4 line/mm, and the AND gates $A_3$ and $A_4$ are activated by a signal b designating the scanning density 8 line/mm. An odd-number stylus line selecting signal c is inputed to the AND gates $A_1$ and $A_3$ with a predetermined timing and then an even-number stylus line selecting signal d is inputed to the AND gate $A_2$ and $A_4$ with a predetermined time delay.

Meanwhile, a picture signal from a transmitter for producing 32 picture elements for the ancillary scanning direction, is connected to divide a group of 16 bit signals for the odd-number styli and a group of 16 bit signals for the even-number styli. The two groups of bit signals are applied to the drivers $X_1$ to $X_{16}$ with predetermined timings differing one from the other.

The drivers $Y_1$ to $Y_4$ raise the potential in the conductors $y_1$ to $y_4$ to a high negative level when outputs $e_1$ to $e_4$ of the AND gates $A_1$ to $A_4$ are applied thereto.

When predetermined picture signals $g_1$ to $g_{16}$ are applied to the drivers $X_1$ to $X_{16}$ respectively, the latter bring the conductors $x_1$ to $x_{16}$ to a ground potential or open them depending on whether the picture signals $g_1$ to $g_{16}$ are of "white label" or of "black label" respectively.

The relation between the recording styli shown in FIG. 2 and the drive circuit shown in FIG. 3 is common to the patent application filed on Dec. 8, 1978 having, Ser. No. 967,834, now abandoned, but some details will be described here. Let us assume that the recording scanning density 4 line/mm is designated for the receiver of a facsimile system in accordance with the scanning density used when scanning was effected in the transmitter of the facsimile system, and as a result the scanning line designating signal a has been inputed to the recording system. Then the picture signal g for 32 pictures elements from the transmitter is divided, in the ancillary scanning direction, into odd-number bit signals $g_{odd}$ for the odd-number recording styli and even-number bit signals $g_{even}$ for the even-number recording styli. The odd-number bit signals $g_{odd}$ are first inputed to the row-direction recording drivers $X_1$ to $X_{16}$ as bit picture signals $g_1$ to $g_{16}$, via a series-to-parallel converting circuit, such as shift registers. During this time, the even-number bit signals $g_{even}$ are temporarily stored in a memory, not shown.

The bit picture signals $g_1$ to $g_{16}$ inputed to the drivers $X_1$ to $X_{16}$ respectively bring the conductors $x_1$ to $x_{16}$ to ground potential or opens them depending on whether the signals are of "white label" or "black label" respectively.

Since the scanning density designating signal a and the odd-number bit signals $g_{odd}$ have been selected, the AND gate $A_1$ is opened by the odd-number stylus line selecting signal c which is inputed thereto, so as to apply a signal $e_1$ to the line-direction recording driver $Y_1$.

Upon the signal $e_1$ being inputed to the driver $Y_1$, the driver Y, brings the potential of the conductor $y_1$ to a high negative level. When the conductor $y_1$ attains a high negative potential level, a negative high voltage is applied to the recording styli connected to the intersections of those of the conductors $X_1$–$X_{16}$ which are in the open state and the conductor $y_1$ in the matrix, so that recording can be effected in a predetermined pattern.

In this way, the odd-number styli $S_1$, $S_3$ . . . $S_{31}$ of the odd-number stylus line of the 4 line/mm scanning density complete recording of the odd-number bit signals $g_{odd}$. Then the even-number bit signals $g_{even}$, temporarily stored in the memory as aforesaid, are retrieved and applied to the drivers $X_1$ to $X_{16}$, while the even-number stylus line selecting signal b is applied to the AND gate $A_2$, so that a signal $e_2$ is applied to the driver $Y_2$.

The recording head moves a predetermined distance together with the carriage 1 and brings the even-number stylus line $S_2$–$S_{32}$ into coincidence with the line of the dots recorded on the recording medium by the odd-number stylus line $S_1$–$S_{31}$. At this time, the signal $e_2$ is generated so as to cause the even-number styli $S_2$, $S_4$ . . . $S_{32}$ of the even-number stylus line of 4 line/mm scanning density to effect recording in conformity with the even-number bit signals.

When recording of the even-number bit signals is completed, another picture signal for 32 picture elements is inputed to the recording system, and the aforesaid cycle of recording is repeated.

The recording operation performed by the recording system when the 4 line/mm scanning density has been selected by the signal a has been described. When the 8 line/mm scanning density is selected by the signal b, recording is carried out in the same manner as when the scanning density 4 line/mm has been selected, except that the drivers $Y_3$ and $Y_4$ are selected in place of the drivers $Y_1$ and $Y_2$ for line-direction recording. Thus the description of the operation for recording with the 8 line/mm scanning will be omitted.

As described hereinabove, pulses of high negative voltage are applied by the drive circuit shown in FIG. 3 to the recording styli shown in FIG. 2 with a predetermined timing, as the recording head 4 moves, so that electrostatic latent images are recorded in a predetermined pattern on a recording medium, not shown.

Referring to FIGS. 1(*a*) and 1(*b*) again, the two printed circuit boards 5 secured to the back of the top of the support frame 6 have formed thereon the circuit portion enclosed by dash-and-dot lines in FIG. 3 or the matrix of resistors R, diodes D and conductors $y_1$ to $y_4$ and $x_1$ to $x_{16}$, and the row-direction recording drivers $X_1$ to $X_{16}$.

The recording styli are connected to the matrix by leads 7 extending from the recording head 4 to the plates 5.

Another circuit portion which should be connected to the circuit portion formed on the printed circuit boards 5 or the line-direction recording drivers $Y_1$ to $Y_4$, AND gates $A_1$ to $A_4$ and a picture signal generating circuit, not shown, are formed in a printed circuit board 8 secured to stationary member of the recording apparatus. Consequently, a total of twenty-one (21) leads 9 including sixteen (16) leads connected to control input terminals of the row-direction recording drivers $X_1$ to $X_{16}$, four (4) leads connected to the matrix conductors $y_1$ to $y_4$ and a common line, not shown, connecting the drivers $X_1$ to $X_{16}$ to the power source, connect the printed circuit boards 5 to the printed circuit board 8. The leads 9 are formed into a bundle which is secured at one end to the support frame 6 by a lead fixing member 10 attached to the surface of the top of the support frame 6, and at the other end to the printed circuit board 8 on the stationary member by a similar member 11. The leads 9 in the form of a bundle extending between the members 10 and 11 has a protective spring 12 wound thereon because the leads 9 are subjected to deformation and displacement as the carriage 1 moves.

The embodiment of the recording system in conformity with the invention is constructed as aforesaid. The leads connecting the recording surface 4*a* of the recording head 4 to the matrix on the printed circuit boards 5 are reduced in length as compared with those of the recording system of the prior art, so that the electrostatic capacity between the wires from the recording surface 4*a* to the drivers $X_1$ to $X_{16}$ is reduced.

In the recording system of the prior art wherein the carriage 1 only supports the recording head 4 and the drive circuit is formed on the printed circuit board 8 secured to a stationary member, for example, the electrostatic capacity between the wires connecting the picture signal recording drivers $X_1$ to $X_{16}$ to the recording surface 4*a* of the recording head 4 is 77 PF. Because of this, the wave form of the pulses generated by the drivers $X_1$ to $X_{16}$ has been deformed, thereby making it impossible to effect recording at high speed. The invention enables the electrostatic capacity between the wires to be reduced to 12 PF because the drive circuit portion is mounted on the carriage 1. The invention has made it possible to effect electrostatic recording at high speed.

According to the invention, the number of leads extending from the recording head 4 on the carriage 1 to the other drive circuit portion on the stationary member of the recording system is reduced to twenty-one (21) from sixty-four (64) of the prior art. As a result, the mass of the movable member has been reduced. Also, in the prior art, pulses of high voltage have been applied to all the sixty-four (64) leads, and the problems have been encountered with regard to insulation and noise prevention. In the recording apparatus provided by the invention, only four (4) of the twenty-one (21) have their voltages raised to a high level, so that insulation and noise prevention do not raise serious problems. In addition, a reduction in the number of leads is conducive to the elimination of undue flexing of the leads caused by the movement of the carriage 1, so that the trouble of wire rupture has been eliminated and reliability of the recording system has been increased.

In the embodiment shown and described hereinabove, only the matrix and the row-direction recording drivers $X_1$ to $X_{16}$ of the drive circuit shown in FIG. 3 are mounted on the carriage 1. However, space allowing, the line-direction recording drivers $Y_1$ to $Y_4$ may also be mounted on the carriage 1. When this is the case, a wire connecting the drivers $Y_1$ to $Y_4$ to the power source has only to be added, and the aforesaid advantages of the invention can also be offered.

In the embodiment shown and described hereinabove, the two printed circuit boards 5 are used for mounting the matrix and the row-direction recording drivers $X_1$ to $X_{16}$ on the carriage 1. It is to be understood that the invention is not limited to the use of two printed circuit boards and that only one printed circuit board may be used for forming the circuit elements thereon.

From the foregoing description, it will be appreciated that the feature of the invention that at least the main elements of the drive circuit for driving the recording styli of the recording head are mounted on the carriage together with the recording head enables the electrostatic capacity between the wires connecting the drive circuit to the recording surface of the recording head to be greatly reduced, thereby enabling electrostatic recording or electric perforating to be carried out at high speed.

It is expected that the invention can achieve the same effect even if the matrix is not used and the drive circuit includes drivers equal in number to the recording styli.

What is claimed is:

1. A recording system of the type for carrying out electrostatic recording, electrostatic printing or electric perforating in a predetermined pattern on a recording medium comprising:

a carriage capable of linear reciprocatory movement;

means for driving said carriage;

a recording head supported on said carriage including at least one stylus disposed in close proximity to the recording medium;

circuit means for applying high potential to said stylus to produce an electrical discharge to an opposed common electrode;

means for supporting on said carriage at least a diode matrix, and at least one of line-direction drivers and row-direction drivers of said diode matrix comprising circuit elements; and leads for electrically connecting the circuit elements supported on said carriage to other circuit elements supported on a stationary member of the recording system.

2. A recording system as claimed in claim 1, wherein said means for supporting the circuit elements on said carriage comprises printed circuit boards having the circuit elements formed thereon, and means for securing said printed circuit boards to said carriage.

3. A recording system as claimed in claim 1 or 2, wherein said carriage further supports thereon means for binding and securedly supporting one end of said leads.

4. In a recording system comprising:

a recording head including a plurality of recording styli in the form of multistyli;

a drive circuit having a diode matrix, line-direction recording drivers and row-direction recording drivers for electrically driving said recording styli; and a carriage supporting said recording head for linear reciprocatory movement crosswise of a recording medium movable in a direction at right angles to the direction of linear reciprocatory movement of said carriage to carry out recording on the recording medium;

the improvement of said recording system comprising said carriage supporting, in addition to the recording head including the recording styli, said diode matrix, and at least either one of said line-direction drivers and said row-direction drivers.

5. In a recording system as claimed in claim 4, wherein said diode matrix includes line-direction conductors, row-direction conductors, resistors and diodes, and said diode matrix and at least one of said line-direction drivers and said row-direction drivers are formed on at least one printed circuit board supported by a support frame, said printed circuit board and said support frame being mounted on said carriage, and said support frame having secured thereto a bundle of leads from said printed circuit board.

* * * * *